United States Patent [19]

Heinberg

[11] Patent Number: 5,954,516
[45] Date of Patent: Sep. 21, 1999

[54] METHOD OF USING QUESTION WRITING TO TEST MASTERY OF A BODY OF KNOWLEDGE

[75] Inventor: Paul Heinberg, Honolulu, Hi.

[73] Assignee: Relational Technologies, LLC, Honolulu, Hi.

[21] Appl. No.: 08/818,664

[22] Filed: Mar. 14, 1997

[51] Int. Cl.$^6$ .................................................. G09B 3/00
[52] U.S. Cl. ........................................ 434/322; 434/353
[58] Field of Search ..................................... 434/322, 323, 434/327, 335, 336, 350, 353, 354, 362, 363

[56] References Cited

U.S. PATENT DOCUMENTS 4,247,995   2/1981   Heinberg .

OTHER PUBLICATIONS

Kelley, Truman J., "The Selection of Upper and Lower Groups for the Validation of Test Items", Journal of Educational Psychology, vol. 30, 17–24, 1939.

*Primary Examiner*—Robert A. Hafer
*Assistant Examiner*—John Edmund Rovnak
*Attorney, Agent, or Firm*—Gordon E. Nelson

[57] ABSTRACT

A person's mastery of a body of knowledge is determined by having the person write objective questions for a test that is given to a group of test takers. The results of the test are then analyzed to determine how well the person's questions discriminated between those who did well on the test and those who did poorly. The better the questions discriminate, the more mastery the person has of the body of knowledge. In a learning situation, a cycle of study, writing questions, analyzing the results, and determining mastery may be repeated until the desired degree of mastery is reached. The technique may be used for individuals or groups and both the question writers and the test takers may work in teams. Question writers may also be test takers, and the evaluation of a question writer may reflect both the extent to which his or her questions discriminate and his or her performance on the test. Any medium may be used for communication between the question writers, test takers, and the parties making and giving the tests. One particularly active alternative is communication via electronic mail, with test taking being done interactively on the Internet.

24 Claims, 5 Drawing Sheets

METHOD OF USING QUESTION WRITING TO TEST MASTERY OF A BODY OF KNOWLEDGE

BACKGROUND OF THE INVENTION

1. Field of the Invention

The invention concerns testing techniques generally and more particularly concerns automated techniques for testing mastery of a body of knowledge.

2. Description of Related Art

One of the most efficient ways of finding out whether someone has mastered a body of knowledge is to give the person a test made up of questions about the body of knowledge and seeing how well the person has answered the questions. In a society which values opportunity and fairness on the one hand and requires technical competence on the other, testing has become enormously important. Test results determine not only an individual's access to educational opportunities or to trades and professions, but are also used to determine the quality of the institutions where the individuals receive their training.

One consequence of the ubiquity and importance of tests in our society has been the development of techniques for validating the questions used in the tests. What is at issue in validation is how well the question discriminates those who have mastered the subject matter in question from those who have not. One technique for validation is dividing the test takers into three groups according to the number of right answers they gave in their tests. The first group contains the test takers that did best; the second group contains the test takers that did worst; the third group contains the average test takers. A given question is validated by comparing the percentage of takers in the first group that answered the question correctly with the percentage of takers in the second group that answered it correctly; the larger the percentage of the first group relative to the second group, the better the question discriminates. See Truman J. Kelley, "The Selection of Upper and Lower Groups for the Validation of Test Items", *Journal of Educational Psychology*, Vol. 30, 1939, 17–24.

Another consequence has been the development of "objective" testing, that is, testing where the test grader's subjective opinion of the student or of the work he is correcting has no influence on the grade. Examples of objective tests are true-false tests or multiple-choice tests. Objective tests have two advantages: first, they ensure fairness in test grading if not in test making; second, they permit automation of the whole process of taking tests, grading tests, and evaluating tests. The automation possible with objective tests has made it possible to administer tests such as the Scholastic Aptitude Test, the Law School Admissions Test, or the Multi-state Bar Examination to enormous numbers of people; it has also lead to the development of a large industry devoted to developing, validating, giving, and grading automated tests.

While objective tests have traditionally been given and graded in batch mode, that is, a group of test takers takes the test using a machine-gradable answer sheet, the sheets are collected, the machine grades them, and the result is returned to the students, the enormous reduction in the cost of computers has also made it possible to give objective tests interactively: the student sits at a terminal, receives each question and the possible answers in turn, and selects a response. The computer to which the terminal is connected can immediately respond to the answer; for example, the computer may terminate the test early if the taker has already done enough to demonstrate his or her competence or incompetence or may determine from the results thus far what areas require further testing and present more questions in those areas.

Automated objective tests have certainly increased the amount and fairness of access to opportunity. Automation has made it possible for enormous numbers of people to take the tests and has also made it possible for them to take the tests literally anywhere. Further, the results of properly-made objective tests have turned out to be good indicators of the taker's mastery of a body of knowledge and of the taker's probable success in applying the knowledge. It has thus become possible for an institution of higher learning, for example, to make a rational judgment about admitting a student about whom the institution of higher learning knows nothing beyond the test scores.

While the success of objective testing is undeniable, objective tests as heretofore made and used have a number of problems. At the root of these problems is the fact that a student's ability to answer in an objective test is necessarily limited to choosing among the responses offered by the test writer. There is no opportunity for the student to actively demonstrate what he or she can do with the subject matter. One consequence of this fact is that taking objective tests is much less interesting than taking other kinds of tests. Another is that students often spend more time and effort figuring out how to "work" an objective test than they do learning the subject matter. Another, more serious consequence, is that if there is a mismatch between what the student knows and what the test asks, there is no way for the student to get outside the questions provided him or her and show what he or she can really do. It is an object of the invention disclosed herein to overcome these and other problems of objecting testing with techniques that make objective tests tools for learning as well as for finding out what the test takers know.

SUMMARY OF THE INVENTION

The invention attains its objective by asking people whose degree of mastery of a body of knowledge is to be evaluated to write objective test questions with answers about the body of knowledge. The test questions are then employed in an objective test, the objective test is administered to a group of test takers, and the graded tests are analyzed to determine the extent to which each test item has a quality indicating mastery of the subject matter by the writer of the question. An objective indication of the degree of mastery of the writer of the question is then based on the quality. The foregoing steps can be iterated as many times as is desirable, with the people being evaluated continuing to study the body of knowledge between iterations.

In a preferred embodiment, the graded tests are analyzed to determine the degree to which the test questions discriminate between a group of test takers who ranked high on the test and a group who ranked low on the test. The persons who contributed questions are then ranked according to the degree that their questions discriminated between the groups.

The above method is analogous to learning by teaching and is just as effective. Just as you have to understand something well in order to teach it, you have to understand it well in order to write questions about it that will discriminate between those who really know the material and those who do not. The method further has all of the advantages of objective testing generally: it can be automated to whatever degree is required and evaluation is not based on the subjective opinions of evaluators, but rather on the objective behavior of a group of test takers.

Many variations on the method are possible. For example, the people writing the questions may also be the people taking the tests made with the questions. In such a situation, the test both tests mastery in the same fashion as the usual objective test and tests the higher-level mastery required to write questions that discriminate well. The method may be used by individuals or it may be used by groups, and the tests may be closed book or open book. An advantage of using the technique in an open book situation is that questions that are purely factual will not discriminate, since any of the participants will be able to easily look up the answer. The use of open books thus forces the question writers to write questions which require the test taker to really think about what he or she has learned, and that forces the question writers to really think as well.

A preferred implementation of the technique has a number of refinements. First, if there is not enough difference between the performance of the high performers and the performance of the low performers in the test, the test is declared invalid and the question writers must write new questions. Second, the questions are ranked for difficulty as well as for discrimination; a question that discriminates well but is so difficult that it is correctly answered by only a few of the best students is less powerful at indicating subject matter mastery than one that also discriminates well but is answered correctly by many test takers. A question's difficulty and ability to discriminate are employed together to determine a ranking of questions by their power to indicate subject matter mastery, and a refined test is made from the highest-ranking questions. The test takers are then ranked according to how well they did on the refined test.

The foregoing objects and advantages of the invention will be apparent to those skilled in the arts to which the invention pertains upon perusal of the following Detailed Description and drawing, wherein:

Figure 1:
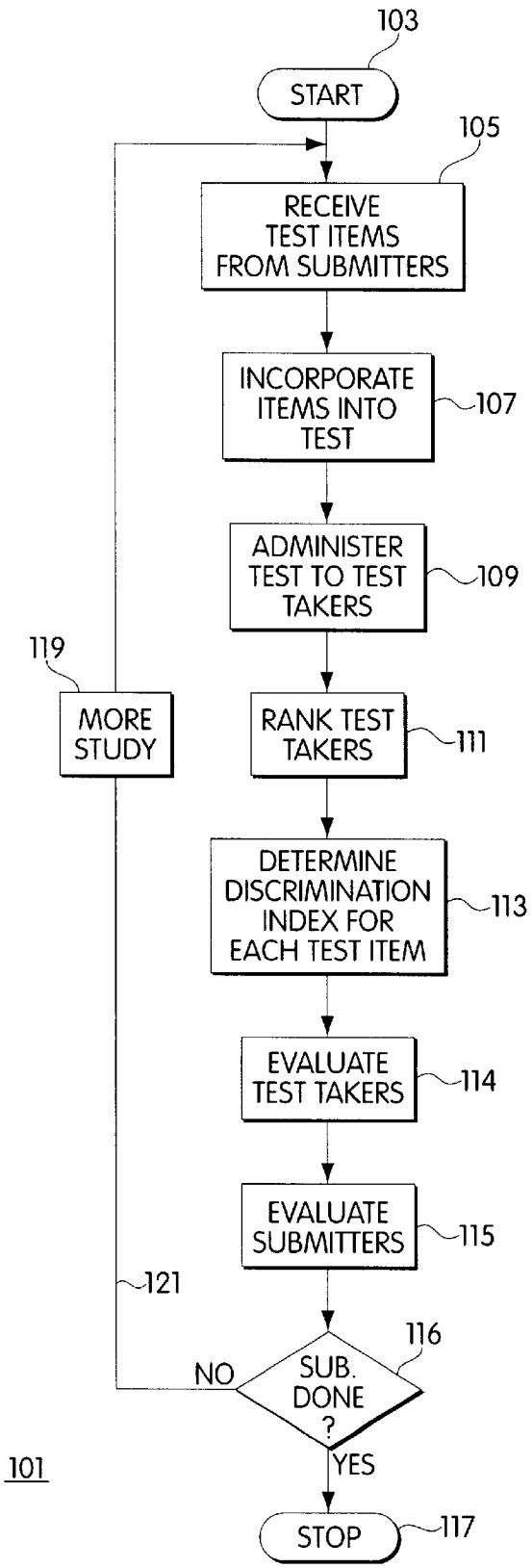
FIG. 1 is a high-level flowchart of the method of the invention.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2

DETAILED DESCRIPTION

The following Detailed description of a preferred embodiment of the invention first presents an overview of the method of the invention and then provides more detailed descriptions of a number of aspects of the method.

Overview of the Method: FIG. 1

FIG. 1 presents an overview of the invention. As indicated in the Summary of the Invention, the invention is a technique for determining a person's mastery of a subject matter by having the person submit objective questions which are then used in a test. The test results are analyzed to determine how well the submitted questions discriminate between test takers who know the subject matter and those who do not, and the mastery of the submitter is rated according to how well his or her questions discriminate.

As shown on at 105 in FIG. 1, the first step of the method is to receive test items from the submitters whose mastery of the subject matter is being determined. The submitter indicates for each test item what he or she regards as the correct answer. The second step is to make an objective test using the test items (107). The third is to administer the test to test takers (109). The test takers may or may not include question submitters; where they do, it is advisable to make sure that the question submitters do not see their own questions (though, as will be pointed out in the discussion of cheating below, the fact that a test taker knows the answers to his or her own questions does not necessarily increase the degree to which the questions will discriminate).

Next, the test takers are ranked by the number of "correct" answers that they had on each test (111). Thereupon, the rankings of the test takers are used to determine a discrimination index for each test item (113). The discrimination index is used to determine how well each test item discriminated between test takers who did well on the test and those who did poorly. Then the performance of the test takers is evaluated (114) (this is not necessary to evaluate the question submitters, but is a useful byproduct of the fact that a test and test takers are required to evaluate the question submitters). Thereupon, the discrimination indexes for the test items submitted by each submitter are used to evaluate the submitter's knowledge of the subject matter. In general, the better the submitter is at writing test items that discriminate well, the greater the submitter's degree of mastery of the subject matter. Of course, if the submitter was also a test taker, he or she may be evaluated both on the basis of his or her success at answering test questions and on the basis of his or her success at writing them. If the evaluation of the submitter demonstrates the submitter's mastery of the subject matter to the evaluator (who may of course be the submitter), the submitter need not continue and the method branches at 116 to 117; otherwise, it branches to 121, the student devotes more effort to mastering the subject matter (119) and the student repeats steps 105 through 116.

The method just described can be used to test both for rote knowledge and for structural knowledge. An item that tests rote knowledge is defined as an item for which the majority of a small group of persons who are literate but are unfamiliar with that field can, given enough time, cite the location of the "correct" answer to that item in the source materials that the test is based on. The method can thus be used to test for rote knowledge by not allowing Test takers access to any of the source materials during testing, or to so limit the time available for test-taking that no time is available for searching in the source materials.

An item that tests structural knowledge is one for which the "correct" answer cannot be located via patient scanning of the provided source materials by literate laypeople. An item that tests structural knowledge requires the Test takers to make fine discriminations among fundamental concepts in that field, and/or to perceive the nature of relationships among concepts, and/or to assign examples to one of a set of concepts, and/or to select which of a set of concepts fits a given example, and/or to select the most appropriate analogy, and/or to generate information via any other kind of cognitive processing to discover the "correct" answer which cannot otherwise be discovered via patient scanning of the source materials. The testing system can thus be used to test level of mastery of structural knowledge in a field by allowing Test takers full access to all of the source materials during testing.

As for the Item submitters, they are graded on how well their questions discriminate, and in situations where the Test takers have full access to the source materials, only carefully made structural items will discriminate effectively. Of course, writing a good structural item requires even more mastery of the source materials than answering one.

While the underlying principle of the method, namely, using someone's skill at writing questions about a subject matter area to judge his or her knowledge of the subject matter, could be used with any kind of question that was amenable to grading, the questions used in the preferred embodiment are objective questions, that is, questions for which the grader has an objective indication of what the "correct" answer is. A major advantage of objective tests is that they can be automated, and the method of FIG. 1 can be practiced using any of the automation techniques available for giving objective tests. Thus, where large groups are involved, the test taking and grading techniques developed for tests such as the Scholastic Aptitude Test can be employed. The tests can of course also be given on an individual basis, and in the age of the personal computer and the Internet, one particularly attractive option is using E-mail to receive questions and communicate test results, using interactive HTML pages on the World Wide Web to administer the test, and using a computer to grade the test.

The method of the invention can of course be used for any purpose that testing is generally used for, but its best application is in testing done as a learning tool. The reason for this is that writing questions is not only an excellent way of showing what one knows, it is also an excellent way of learning. Generally, all that is required for the method is a group of participants who have agreed to study a particular body of knowledge and then to be tested for mastery of that body of knowledge. One more obvious example of such a group is a group of people that are preparing for a professional examination such as the Bar Examination. Another example is a group with a shared private interest, for example baseball fans, who desire to learn more about their area of interest. A particular advantage of the method in this situation is that the group can use it to teach itself. The method does not require someone with special knowledge to function as a test author, test grader, or evaluator of the knowledge of the group members, although a system monitor, or SM may be useful to make sure that the mechanics of the method are properly carried out.

The method is further in no way dependent on how the body of knowledge is presented to the participants. The body of knowledge may be simply printed materials, it may be visual or audio materials, it may be interactive, and it may be made available to the learners by any means whatever.

Participants in the Method

There are two kinds of Participants: Test takers, who take tests, and Item submitters, who submit items for the tests. Test takers may operate as individuals or as teams and the same is true of the Item submitters. Hence, for example, for 36 Participants, there could be 36 Item submitters, each of whom submits one item, 18 Item submitting teams, each of which submits 2 items, or 12 such teams, each of which submits 3 items. The number of Item submitters may vary greatly from a low of as few as approximately 6 up to many thousands, but for most purposes a size of approximately 12 to 40 Item submitters may occur by enrollment or be required by the system monitor and/or supervisor(s), based on educational, economic and other factors.

The Test Items

A submitted ITEM is a MULTIPLE-CHOICE test question consisting of from 2 to n foils (alternative responses) together with the item submitter's identification of the "correct" answer. Each Item submitter should be required to adhere to pre-specified rules that specify item format, such as n (maximum number of foils), whether foils are to be numbered or alphabetized, maximum line and item length, indentations, where and how the identification of the "correct" answer is to be made, etc., and rules that specify the required style of item construction. Style characteristics should be specified to minimize the difficulty in test-taking that would tend to ensue with the Test takers having to read succeeding questions written in different styles.

To increase the randomness in terms of which foil in the sequence of foils is the "correct" answer to each submitted item, Item submitters may be required to arrange the foil sequences for their submitted items such that a different letter or number is indicated as the "correct" answer for each of their submitted items. Or the System manager may notify Item submitters that the sequence of foils on any submitted item may be rearranged by the System manager to increase the randomness in the sequence of "correct" answers.

The number of items that an item submitter may submit for the test depends upon, among other factors, the difficulty level of the subject matter, the number of Test takers, and the time allowed for Test takers to take the test (which can vary from less than one hour to many weeks). Items for the test may be submitted by hand, faxed or mailed to the same address, telecommunicated such as via E-mail or via a computer and a modem to a properly programmed mainframe computer, or by any other means that tends to assure arrival of all items for that test to a particular destination by a specified date and time.

If the participants know one another (which they would not if, for example, the group were a random sub-set of a large and widely distributed population), it is generally desirable to minimize the ability of Test takers to identify which items were submitted by which of their acquaintances. In that case, upon arrival of all items for the test, those items should be arrayed such that each of the individuals' or teams' submitted items appears approximately (but not exactly) equidistant from one another in terms of item number assigned to that submitter's items.

Tests and Test Takers

The DP (data-processor: a human or a computer program) numbers each item, records the submitter's identification of the correct answer for each item, and adds any other pertinent information such as test name, blanks for the name and code of each Test taker, etc., and then distributes the test to the Test takers, as printed copies or displayed on each Test taker's view screen, or by any other means. For example, if each item is submitted on a separate card, cards may be numbered and then cut and pasted onto test pages, and then those pages can then be photocopied to constitute printed copies of the test.

Just as Item submitters may be teams or individuals, Test takers may be teams or individuals, and the Test takers may be the same persons who were the Item submitters or the Item submitters and Test takers may be different partly or entirely from each other. For example, a group of 40 Participants can be divided into Subgroups A and B of 20 each such that the 20 in Subgroup A are Item submitters for the test taken by Subgroup B, and vice versa.

Administering the Tests

The full contents of all items except the correct answers identified by the submitters for those items can be displayed to all Test takers for the entire duration of the test, in which case it can be said that each Test taker is in control of how much of the allowed total test time is given to each test item. Or the stem for each item (information preceding the list of foils) can be displayed to each Test taker for a certain amount of time (such as being projected on a movie screen or displayed at each Test taker's computer terminal), followed by the display of that item's list of foils for a fixed amount of time, and this process is repeated for each successive item. Or the foils for each item may be displayed thus to each Test taker, followed by the redisplay of the stem for that item for a fixed amount of time. In such cases, it can be said that the System Monitor is in control of the distribution of allowed test time to each test item.

A means is provided for each Test taker to indicate her, his or their answer (choice among foils or non-response) to each test item. As examples, the test can be distributed in printed form to each Test taker together with an electronically or manually scoreable answer sheet, or a printed copy of the test can be provided to each Test taker with the answer to each item to be electronically transmitted to the computer that is programmed to run the system as soon as that Test taker selects that answer, or Test takers may have a choice of transmittal media, including the right to telephone to a recorder or transcriber a Test taker's responses. Hence, the locale at which each Test taker provides responses may be at each Test taker's home or at one or more sites where one or more response transmission devices of the same or various kinds are located.

Figure 2:
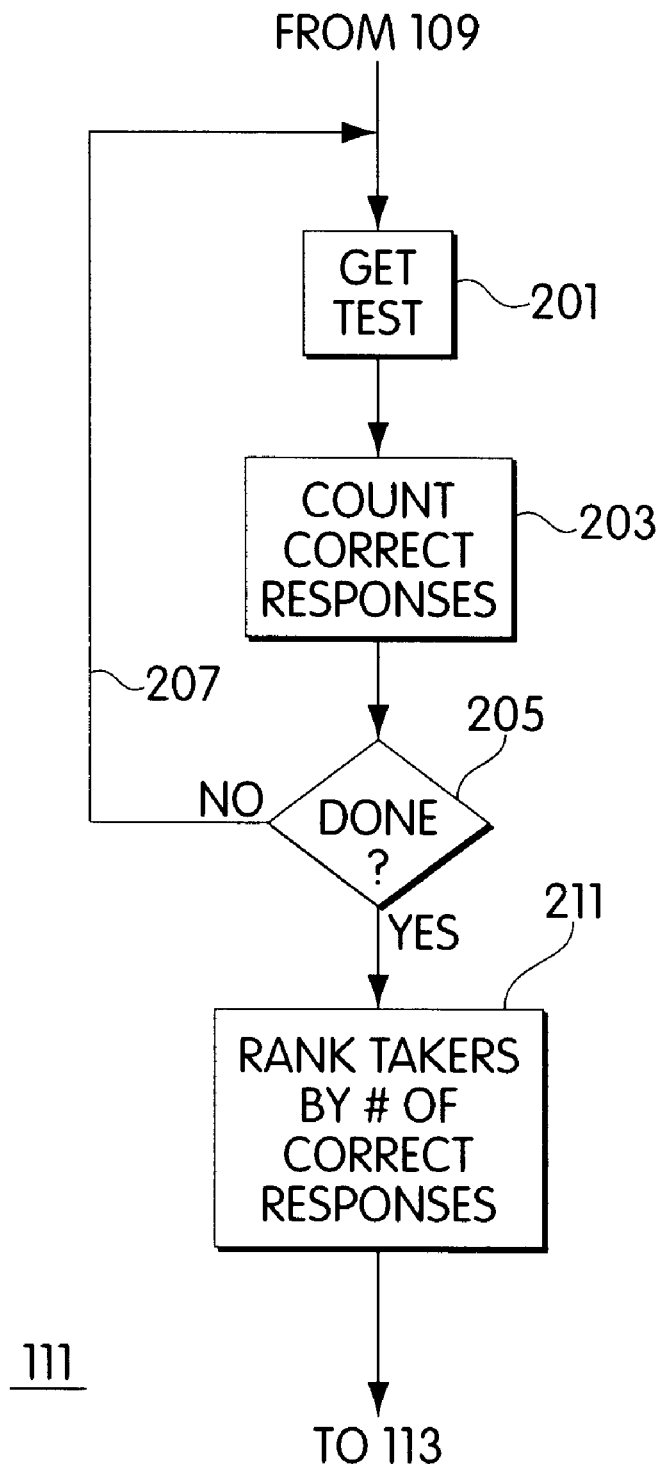
FIG. 2 is a detailed flowchart of block 111 of the flowchart of FIG. 1.

Ranking Test Takers: FIG. 2

After the specified deadline for receipt of the responses of each Test taker, the DP records the NTT (number of test-takers), the name and/or code for each, and each response of each Test taker. Since the DP has previously recorded the submitter's identification of the correct answer for each item, those data constitute the "correct" answers for that test. That information enables the data processor to perform the steps of FIG. 2. The data processor takes each test in turn (block 201) and counts the number of responses made by that Test taker that agree with the submitter's identified correct answer for the item (block 203). As shown at decision block 205 and branch 207, this process continues until all of the tests have been processed. The data processor then ranks each Test taker's test from 1 (highest number of "correct" responses) to NTT (lowest number of "correct" responses) (block 211). In case of ties, conventional ranking procedures should be followed. That is, the ranks assigned to tied scores will sum the same as the ranks that would be assigned were those scores not tied. E.g, if 3 scores are tied for 5th, 6th and 7th, each will be assigned the rank of 6th, and if 2 scores are tied for 5th and 6th, each will be assigned the rank of 5.5.

Figure 3:
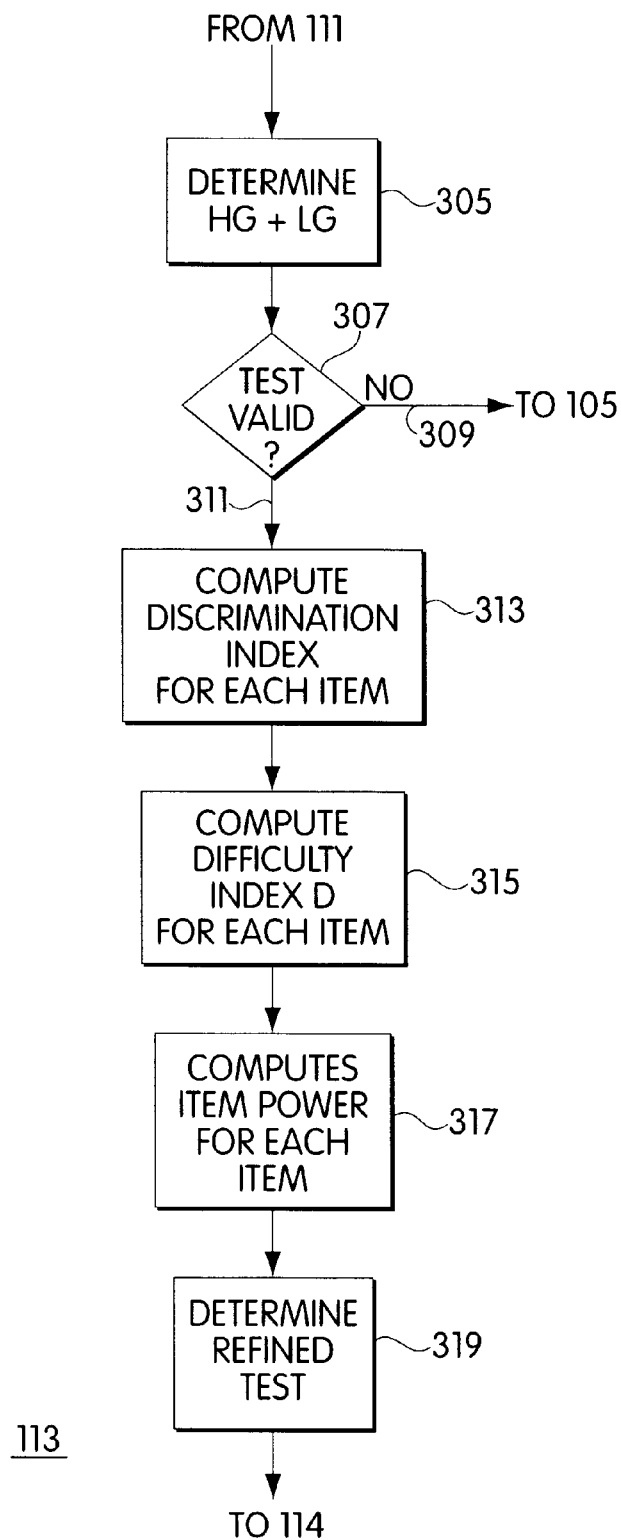
FIG. 3 is a detailed flowchart of block 113 of the flowchart of FIG. 1.

Determining the Quality of the Test Items: FIG. 3

The flow chart of FIG. 3 shows how the quality of each test item is determined in a preferred embodiment. First, the test takers are divided into three groups based on the ranks of their tests: a middle group, a high group, and a low group(block 305). The high group and the low group are of equal size. Then the difference in scores between the high and low groups is examined (block 307). If it is not great enough, the test is invalid and a new test must be made and given, so branch 309 is taken. Otherwise, branch 311 is taken. At block 313, the discrimination index for each test item is computed; at block 315, the difficulty index is computed; at block 317, the item power is computed; at block 319, finally, a refined test containing those questions of the highest quality is determined. In the following, each of these steps will be explained in more detail.

Beginning with the division into groups, the highest and lowest group should preferentially constitute approximately twenty-seven percent (27%) of the NTT. This percentage has been found to give maximum predictability of the total test scores from a knowledge of the responses to that item. (See Kelley, Truman J., "The Selection of Upper and Lower Groups for the Validation of Test Items," *Journal of Educational Psychology*, Vol. 30, 1939, 17–24, and Johnson, A. Pemberton, "Notes on a Suggested Index of Item Validity: The U-L Index," *Journal of Educational Psychology*, Vol. 42, 195 1, pp. 499–505). With small NTT's the number of those in the Highest group (HG) plus the number of those in the lowest group (LG) may be considerably larger than 54%.

All Item submitters and Test takers should be informed that if the distribution of test scores is such that a high group and low group of at least 3 each cannot be determined, the test is invalid and a new test made from new questions must be made and given.

If the test is found to be valid, the DP tabulates the total number of responses to each foil for each item made by the Highest group, and the total number of responses to each foil for each item made by the Lowest. These data will be among the data and statistics that will be provided to each Participant, Item submitter, and Test taker. Each item's DISCRIMINATION INDEX, k, is then computed. Where $C_{HG}$ is the number of "correct" responses to that item made by the Highest group, where $C_{LG}$ is the number of "correct" responses to that item made by the Lowest, where NHG is the number of test-takers in the Highest group, where NLG is the number of test-takers in the Lowest, and where NG=NHG=NLG, $$k=(C_{HG}-C_{LG})/NG$$

An item with an ideal k is one for which $C_{HG}$=NHG and $C_{LG}$=0. The value of k for any item can range from a maximum of +1.00 to a minimum of −1.00.

Next, each items DIFFICULTY INDEX, D, is computed. The Difficulty Index for an ideal item is such that exactly one-half of the total number in the two groups (NG+NLG) answer that item "correctly." The ideal D of 0.50 is due to the fact that the ideal item is one for which $C_{HG}$=NHG and $C_{LG}$=0. The Difficulty Index (nearness to ideal difficulty) is computed thus:

If $(C_{HG}+C_{LG})$ is less than or equal to NG, then:
$D=(C_{HG}+C_{LG})/2NG$

If $(C_{HG}+C_{LG})$ is greater than NG, then:
$D=[2NG-(C_{HG}+C_{LG})]/2NG$

The value of D can range from a maximum of 0.50 to a minimum of 0.00.

The ITEM POWER, IP, of any item can be defined for the group as IP=k, or as IP=100 kD, or as any particular weights, a and b, for k and D (i. e., IP=100akbD).

The AVERAGE ITEM POWER (AIP) of the items provided by each Item submitter (individual or team) is then computed. It is simply the average of the Item Powers for the items.

The RAW TEST includes all items that were included on the test. Each Test taker's RAW SCORE is the number of items on the entire test (Power Items plus other items) which that Test taker answered "correctly." A POWER ITEM, PI, is defined for the group as any item whose power equals or exceeds a specified value. For example, if P=100 kD, a PI can be defined as any item whose P is at least +12. The REFINED TEST is defined as the test consisting only of the Power Items.

Grading

The final step is grading each Participant. Those who are Test takers receive grades based on how well they did on the test; those who are Item submitters receive grades based on the quality of the questions they submitted.

Figure 4:
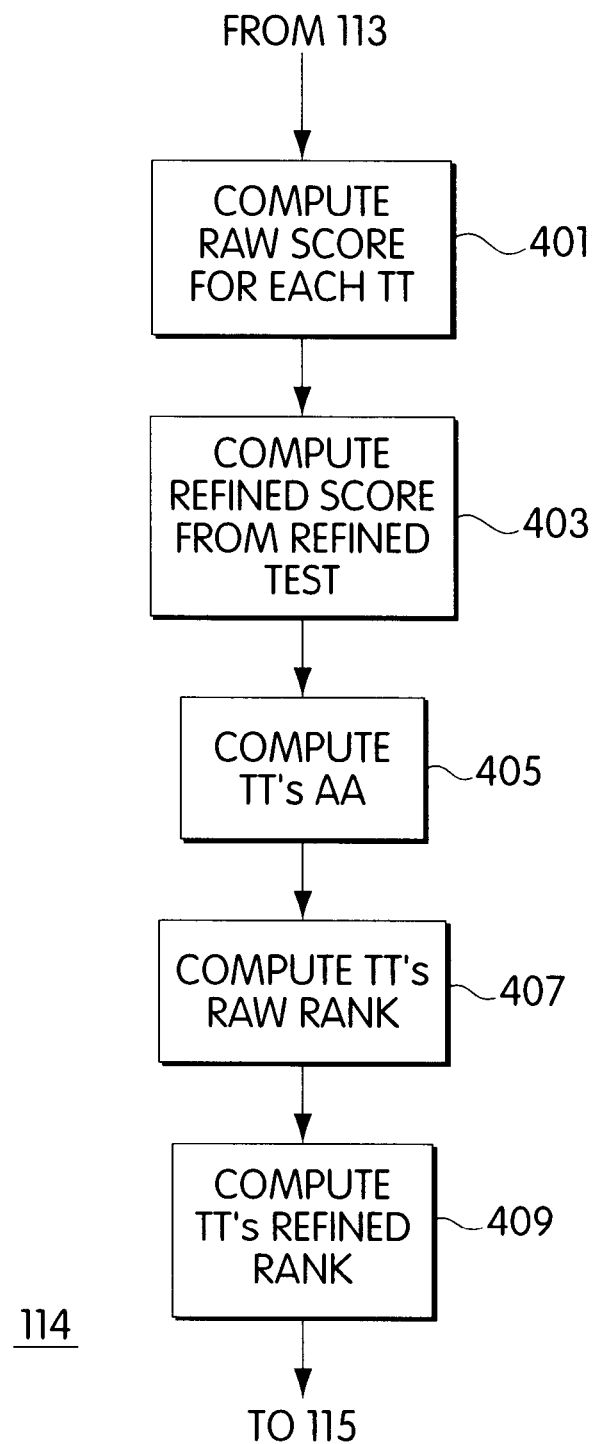
FIG. 4 is a detailed flowchart of block 114 of the flowchart of FIG. 1.

Grading the Test Takers: FIG. 4

FIG. 4 shows the steps involved in grading the Test takers. The first step, 401, is to compute the raw score for each Test taker. Then the REFINED SCORE is computed from the previously-determined REFINED TEST (403). That done, the test taker's absolute achievement (405), raw rank (407), and refined rank (409) are computed. Each of these steps is explained in more detail in the following.

The DP begins by rescoring every Test taker's test (not just those in the HG and LG) in terms of the number of items on the Refined Test that were answered "correctly" by that Test taker. Each Test taker's REFINED SCORE is the number of items on the Refined Test which that Test taker answered "correctly." Each Test taker's absolute level of achievement on the test is that Test taker's score on the Raw Test, or score on the Refined Test, or some mathematical combination of those two scores. If one measure of absolute achievement (AA) is desired, it can be any mathematically weighted combination of those two scores (i. e., AA aRAWSCbREFINSC).

Each Test taker's RAW RANK (relative level of achievement compared with all of the other Test takers in the group) is the rank of that Test taker's score on the Raw Test. Each Test taker's REFINED RANK is the rank of that Test taker's score on the Refined Test. If one measure of relative achievement (RA) is desired, it can be any mathematically weighted combination of those two ranks (i. e., RA=aRAWRKbREFINRK).

Grading Item Submitters

Figure 5:
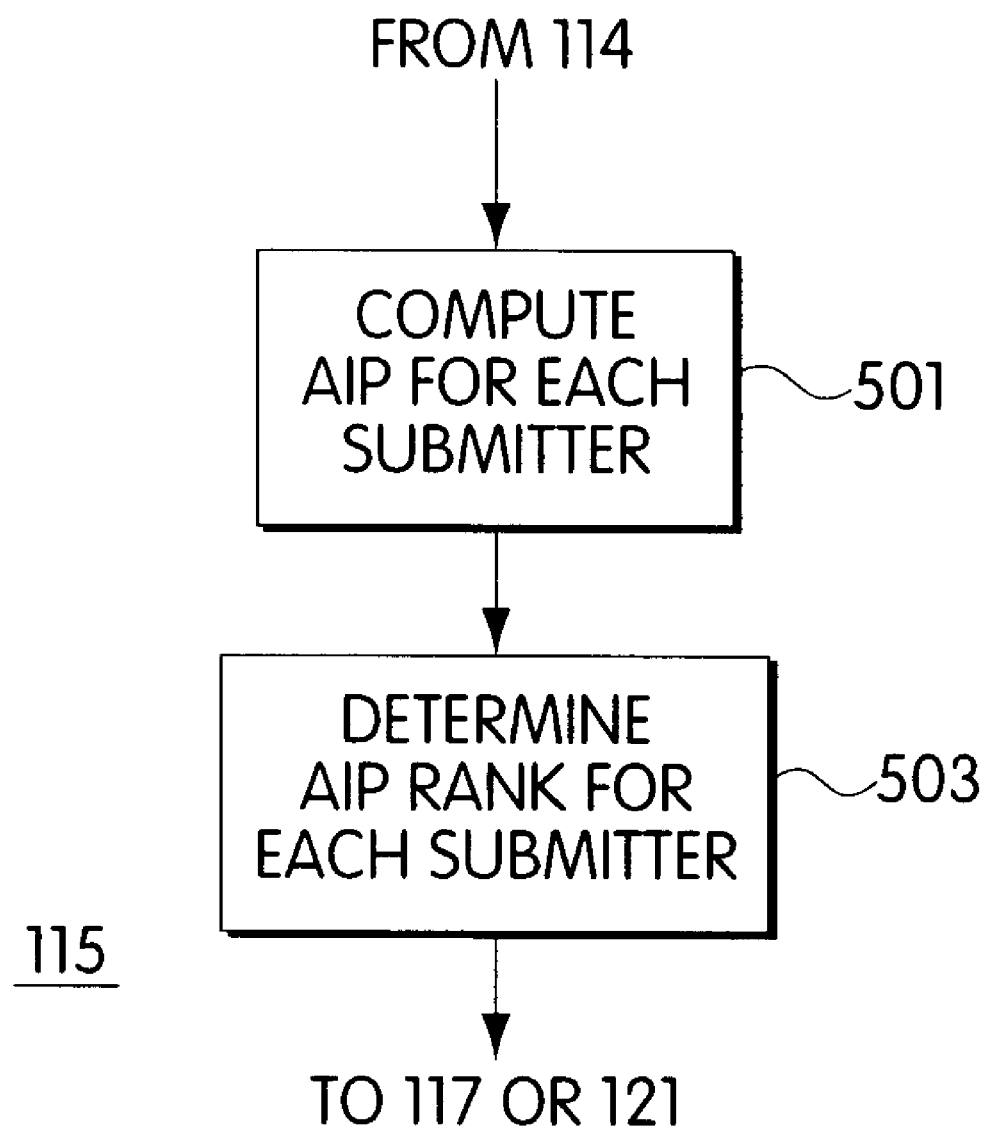
FIG. 5 is a detailed flowchart of block 115 of the flowchart of FIG. 1.

FIG. 5 shows the steps involved in grading Item submitters. First, the Average Item Power (AIP) is computed (501). Then the submitters are ranked by AIP (503). Each Item submitter's absolute level of achievement on the test is the AIP (Average Item Power) of his/her/their submitted items. Each Item submitter's relative level of achievement on the test (compared with all of the other Item submitters who submitted items for that test) is the rank of that Item submitter's AIP, or AIP RANK.

Information that should be provided to each participant should include, for each test item, the number of responses to each foil by the HG and the LG, the k, D and IP for each item, which foil is the "correct" answer, the answer selected by that Test taker for each item, that Test taker's Raw Score, Refined Score, and that Test taker's Raw and Refined Ranks.

Cheating

In many situations in which the testing method just described is employed, some or all of the Item submitters are also the Test takers for that submitted test. That fact raises the possibility that the Item submitter may encounter one or more of the questions he or she submitted while taking the test. However, should that actually happen, it is still not easy for the Item submitter to determine how he or she should answer the question. From the point of view of an Item submitter, the best answer to a question is the one foil which, if that foil were chosen as the "correct" answer by that Item submitter, would attain the highest k value. Hence, an Item submitter confronting an item which he or she has submitted must decide whether he or she as a Test taker is likely to score in the lowest third or forth of all of those Test takers taking that test and, if so, to answer that submitted item incorrectly or (if allowed) to omit answering that item. To answer each of one's own submitted item(s) "correctly" and then to score low enough for one's test to be assigned to the LG considerably reduces the power attained by each such item. The smaller the number in the group taking the test, the greater is that reduction in attained power.

Several factors further mitigate against Item submitters sharing information with other Item submitters about the contents of their items and which of the foils in each of their items is the "correct" answer. As the number of available Test takers increases, more groups of Test takers can be formed to decrease or reduce to zero the likelihood of any Item submitter serving as a Test taker of a test on which that Item submitters item(s) appear(s). Item submitters further may not know one another or be able to identify one another if the Item submitters are geographically and/or temporally dispersed. However, even if all Test takers are to be the Item submitters for those items on that test, those who understand the nature of the system are reluctant to share their "correct" answers with one another for at least two reasons. One is that the difficulty of deciding whether to answer each such item "correctly" or "incorrectly" must then be dealt with, not only on those items which that Item submitter has submitted but on those other items about which that Item submitter has been given knowledge by another Item submitter of the "correct" answer. Another factor suppressing Item submitters who then become Test takers on a test of their own items from sharing information with one another is that, if such information is fully shared, all Test takers will achieve the same or almost the same Raw Score, and there will be no ability to form two groups of high and low, and that test will thereby be invalid. And if such information is shared among a few such Item submitters, the distribution of scores will tend to be bimodal, and the coalition that shared information will subsequently tend to encounter an anti-coalition coalition on the next test, thus producing an invalid test or a test with extremely few or no Power Items.

Conclusion

The foregoing Detailed Description has disclosed to those skilled in the arts to which the invention pertains the best mode presently known to the inventor of implementing his technique for testing mastery of a body of material by having the person being tested write test questions and then determining how well the test questions distinguish between those who have mastered the subject matter and those who have not. As will be immediately apparent to those skilled in the art, the technique may be used with any kind of objective test and the quality of the questions submitted by the people being evaluated may be determined in any way which is both objective and useful. In particular, the invention is not limited to the techniques disclosed herein for computing the discrimination index or the difficulty index. Similarly, any kind of grading and ranking arrangement which is both objective and useful may be used for ranking test takers and grading the tests. The invention is further not limited to any particular technical means for collecting questions, making and distributing tests, taking tests, grading tests, and returning results to the users. Any that is practical for the circumstances may be employed.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of determining a degree of mastery by a person of a body of knowledge, the method comprising the steps of:
   receiving objective test items about the body of knowledge from the person;
   making an objective test incorporating the test items;
   administering the test to a group of test takers;
   analyzing the graded tests objectively to determine for each test item the extent to which the test item has a quality indicating mastery of the subject matter by the person; and
   basing an objective indication of the degree of mastery by the person at least in part on the degree to which the test items have the quality.

2. The method set forth in claim 1 wherein:
   in the step of analyzing the graded tests, the quality includes the degree to which the item discriminates between test takers who do well on the test and test takers who do poorly on the test.

3. The method set forth in claim 2 wherein
   each objective test item includes an indication of a correct response,
   the method further comprises the step of:
      ranking the test takers according to the number of correct responses on their tests; and
   the step of analyzing the graded tests includes the steps of;
      using the ranking to determine a first group of test takers who did well and a second group who did poorly; and
      using the first group and the second group to determine the degree of discrimination for the test items.

4. The method set forth in claim 3 wherein:
   the step of using a ranking to determine a first group and a second group determines groups of equal size.

5. The method set forth in claim 4 wherein:
   each of the first and second groups contains on the order of 27% of the test takers.

6. The method set forth in claim 3 wherein:
   the step of analyzing the graded tests further includes the step of:
      using the first and second groups to determine a degree of difficulty for the test items; and
      the step of basing an objective indication further bases the objective indication on the degree of difficulty.

7. The method set forth in claim 3 further comprising the step of:
   basing an objective indication of a degree of mastery of the subject matter by each test taker on the rank of the test taker.

8. The method set forth in claim 7 further comprising the steps of:
   ranking the test items on the basis of how well the test items discriminate;
   defining a refined test that contains only those test items which discriminate better than a given degree; and
   basing the objective indication on the rank of the test takers according to the number of correct responses to the questions in the refined test.

9. The method set forth in claim 3 wherein
   there is a plurality of persons whose degree of mastery is to be determined and the step of basing an objective indication of the degree of mastery further comprises the steps of:
      determining an item power for each item which indicates at least a degree to which the item discriminates;
      for each person, determining an average item power for the items received from the person; and
      ranking the persons according to the average item power.

10. The method set forth in claim 3 further comprising the step of:
    terminating the method if the ranking does not permit determination of the first group and the second group.

11. The method set forth in claim 2 wherein:
    in the step of analyzing the graded tests, the quality further includes a difficulty measure for the test items.

12. The method set forth in claim 1 wherein
    each objective test item includes an indication of a correct response and the method further comprises the step of:
       basing an objective indication of a degree of mastery of the subject matter by the test takers on the number of correct responses made by the test taker.

13. The method set forth in claim 1 wherein
    there is a plurality of persons whose degree of mastery is to be determined and the step of basing an objective indication of the degree of mastery further comprises the steps of:
       determining an item power for each item which indicates at least a degree to which the item has the quality;
       for each person, determining an average item power for the items received from the person; and
       ranking the persons according to the average item power for their items.

14. The method set forth in claim 1 and further comprising the steps of:
    objectively determining whether the objective indication of the degree of mastery indicates sufficient mastery and if it does not,
    repeating the steps of the method with the person.

15. The method set forth in claim 1 wherein:
    at least the step of analyzing the graded tests is performed using a computer system.

16. The method set forth in claim 15 wherein:
    the step of basing an objective indication is further performed using a computer system.

17. The method set forth in claim 16 further comprising the step of:
    sending the objective indication to the person and wherein the steps of
       receiving the objective test items from the person,
       administering the test, and
       sending the objective indication are all performed using a data network.

18. The method set forth in claim 17 wherein
each objective test item includes an indication of a correct response and the method further comprises the steps of:
basing an objective indication of a degree of mastery of the subject matter by the test takers on the number of correct responses made by the test taker; and
using a data network to send the objective indication to the test takers.

19. The method set forth in claim 2 wherein:
there is a plurality of persons whose degree of mastery is to be determined;
a plurality of tests are made in the step of making an objective test; and
in the step of administering the test, the group of test takers includes the plurality of persons.

20. The method set forth in claim 19 wherein:
in the step of administering the test, a test is not administered to a person from whom a test item used in the test was received.

21. The method set forth in claim 19 wherein:
the method further comprises the step of ranking the test takers according to how well they did on the test; and
in the step of basing an objective indication of the degree of mastery, the objective indication is further based on how the persons ranked as test takers.

22. The method set forth in claim 1 wherein:
there is a plurality of persons whose degree of mastery is to be determined;
in the step of receiving the test items, the test items are received from teams of the persons; and
in the step of basing an objective indication, the objective indication is an objective indication for the team from whom the question was received.

23. The method set forth in claim 22 wherein:
in the step of administering the tests, the tests are administered to teams of test takers; and
the method further includes the step of ranking the teams of test takers according to how well they did on the test.

24. The method set forth in claim 1 wherein:
in the step of administering the tests, the access of the test takers to the body of knowledge is restricted.

* * * * *